US009001210B2

(12) United States Patent
Tanaka (10) Patent No.: US 9,001,210 B2
(45) Date of Patent: Apr. 7, 2015

(54) SURVEILLANCE CAMERA SYSTEM (75) Inventor: Yasunori Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1925 days.

(21) Appl. No.: 11/848,059

(22) Filed: Aug. 30, 2007

(65) Prior Publication Data
US 2008/0055412 A1 Mar. 6, 2008

(30) Foreign Application Priority Data

Aug. 31, 2006 (JP) ................ P 2006-235885

(51) Int. Cl.
| H04N 7/18 | (2006.01) |
| G08G 1/04 | (2006.01) |
| H04N 5/232 | (2006.01) |
| H04N 5/235 | (2006.01) |
| H04N 5/247 | (2006.01) |

(52) U.S. Cl.
CPC .. *H04N 7/18* (2013.01); *G08G 1/04* (2013.01); *H04N 5/23212* (2013.01); *H04N 5/2355* (2013.01); *H04N 5/247* (2013.01)

(58) Field of Classification Search
USPC .............................. 709/200–227; 348/36–248
See application file for complete search history.

(56) References Cited

U.S. PATENT DOCUMENTS

| 4,951,080 | A | * | 8/1990 | Sakamoto et al. ............ 396/159 |
| 4,958,185 | A | * | 9/1990 | Kamiya et al. ................ 396/271 |
| 6,240,253 | B1 | * | 5/2001 | Yamaguchi et al. ........... 396/61 |
| 6,377,331 | B1 | * | 4/2002 | Matsushima ................... 355/40 |
| 6,724,421 | B1 | * | 4/2004 | Glatt ............................. 348/154 |
| 7,408,137 | B2 | * | 8/2008 | Sawachi ...................... 250/208.1 |
| 2002/0040480 | A1 | * | 4/2002 | Koike ............................ 725/105 |
| 2002/0180759 | A1 | * | 12/2002 | Park et al. ..................... 345/629 |
| 2002/0196330 | A1 | * | 12/2002 | Park et al. ....................... 348/49 |
| 2003/0071896 | A1 | * | 4/2003 | Hunter ............................ 348/88 |
| 2003/0160863 | A1 | * | 8/2003 | Kakou et al. .................... 348/46 |
| 2004/0008773 | A1 | * | 1/2004 | Itokawa .................... 375/240.08 |
| 2004/0017470 | A1 | * | 1/2004 | Hama et al. ..................... 348/42 |
| 2005/0007453 | A1 | * | 1/2005 | Ahiska .......................... 348/143 |
| 2005/0270387 | A1 | | 12/2005 | Watanabe et al. |
| 2005/0275721 | A1 | * | 12/2005 | Ishii ............................. 348/159 |
| 2006/0044390 | A1 | * | 3/2006 | Ono .............................. 348/143 |

(Continued)

FOREIGN PATENT DOCUMENTS

| DE | 44 34 131 A1 | 3/1998 |
| FR | 2 870 422 A1 | 11/2005 |

(Continued)

OTHER PUBLICATIONS

Extended European Search Report issued May 4, 2010 in corresponding European patent application No. 07016659.0.

(Continued)

*Primary Examiner* — Anthony Mejia
(74) *Attorney, Agent, or Firm* — Birch, Stewart, Kolasch & Birch, LLP (57) ABSTRACT

A surveillance camera system includes a first camera 5 having an angle of view θ1, a second camera 6 which is a combination of two camera modules 6a, 6b each having an angle of view θ2, a third camera 7 which is a combination of three camera modules 7a, 7b, 7c each having an angle of view θ3, and a local camera 8 having an angle of view θs. The first to third cameras 5 to 7 act as area surveillance cameras to which the optimum shooting distance is set, respectively. The local camera 8 takes a shot of a local area, which is set in a shooting area of the third camera 7, at the narrowest angle of view θs. The respective cameras take a shot individually under automatic exposure control.

13 Claims, 6 Drawing Sheets

(56) References Cited

U.S. PATENT DOCUMENTS

| | | | |
|---|---|---|---|
| 2006/0056056 A1* | 3/2006 | Ahiska et al. | 359/690 |
| 2006/0098091 A1* | 5/2006 | Chun | 348/143 |
| 2006/0244826 A1* | 11/2006 | Chew | 348/143 |
| 2006/0268102 A1* | 11/2006 | Ginther | 348/36 |
| 2007/0116447 A1* | 5/2007 | Ye | 396/79 |
| 2007/0180482 A1* | 8/2007 | Frink et al. | 725/105 |
| 2010/0265331 A1* | 10/2010 | Tanaka | 348/159 |

FOREIGN PATENT DOCUMENTS

| | | |
|---|---|---|
| JP | 9-322047 A | 12/1997 |
| JP | 2000-78483 A | 3/2000 |
| JP | 2001-211383 A | 8/2001 |
| JP | 2003-319248 A | 11/2003 |
| JP | 2005-117635 A | 4/2005 |
| JP | 2005-167923 A | 6/2005 |
| JP | 2006-14291 A | 1/2006 |

OTHER PUBLICATIONS

S. Mann et al.; "On Being 'Undigital' with Digital Cameras: Extending Dynamic Range by Combining Differently Exposed Pictures"; Final Program and Advance Printing of Papers. Annual Conference: Imaging on the Information Superhighway: May 7, 1995, pp. 442-448.

* cited by examiner

SURVEILLANCE CAMERA SYSTEM

CROSS-REFERENCE TO RELATED APPLICATIONS

This application is based upon and claims the benefit of priority from the Japanese Patent Application No. 2006-235885 filed on Aug. 31, 2006, the entire contents of which are incorporated herein by reference.

BACKGROUND OF THE INVENTION

1. Technical Field

The invention relates to a surveillance camera system using a plurality of cameras and, more particularly, a surveillance camera system capable of preventing such a situation that captured information of a particularly important local area in a shooting area is lost due to overexposure/underexposure while continuing the shooting under automatic exposure control.

2. Description of the Related Art

As a camera for use in surveillance, normally a digital camera having an automatic exposure controlling function is used. Exposure control is made such that an integrated brightness level in the overall shooting area is set properly. Control of an exposure value is made by adjusting a diaphragm incorporated into an imaging lens, a charge storage time of an image sensor, and a gain of an imaging signal obtained by the image sensor, based on one photometric value derived from the overall shooting area. Such exposure control system requires less burden in terms of both the hardware and the software and is stable in operation. On the other hand, when great variation of brightness is caused in a part of the shooting area, its influence is prone to extend over the full screen. Therefore, this exposure control system has such a problem that since an original target of surveillance is overexposed or underexposed, it becomes difficult to get adequate image information.

In order to address this problem, the following approaches have been known. That is, JP 2001-211383 A discloses when variation in a brightness level in the shooting area can be predicted on a time basis and a season basis, the exposure control is applied by utilizing already-known information in such a manner that the brightness level of a subject which is a target of surveillance is not excessively changed. Also, JP 2003-319248 A discloses that the maximum brightness and the minimum brightness are detected from a shooting screen, then a photometric value is calculated in response to what extent a high brightness area extending from a predetermined high brightness level to the maximum brightness and a low brightness area extending from a predetermined low brightness level to the minimum brightness are contained in the overall shooting screen as an area ratio, and then the exposure control is applied based on this photometric value.

However, the approach disclosed in JP 2001-211383 A is effective for a previously expected environmental change such as change in a solar position, change in weather, or the like, but cannot deal with an artificial or unexpected change. Also, in the approach disclosed in JP 2003-319248 A, in order to evaluate a brightness distribution pattern in the whole screen, it is necessary to acquire brightness information by dividing the shooting screen into pixel units or a plurality of areas. Thus, image processing becomes complicated and a processing time is prolonged. Therefore, a follow-up performance also becomes an issue in the case where the brightness of a part of the shooting screen is changed within a short time. Also, when the type of camera or a shooting magnification ratio is changed in response to the purpose of surveillance, it is necessary to change a photometric program or exposure control program. Thus, there is a drawback in the viewpoint of versatility.

SUMMARY OF THE INVENTION

The invention has been made in view of the above circumstances, and it is an object of the invention to provide a surveillance camera system capable of taking a shot in a local area at proper exposure not to be affected by exposure control of the overall shooting area when a local area that needs particularly detailed surveillance exists in a shooting area as a target of surveillance.

According to an aspect of the invention, an area surveillance camera focused for a first shooting distance shoots the entire predetermined shooting area determined based on an angle of view. A local area which is a part of the predetermined shooting area is shot with a local camera provided separately. These cameras take a shot individually under individual automatic exposure control, respectively. The local camera shoots a subject at a magnification ratio substantially equal to that of the area surveillance camera.

The area surveillance camera is not always limited to a single camera. A plurality of camera modules that individually shoot partitioned areas obtained by partitioning the wide shooting area as a target of surveillance into substantially identical areas may be employed in combination. In such a case, the local camera is configured to shoot the local area, which is a part of any one of the partitioned areas, at the angle of view narrower than those of the camera modules or shoot the local area, which is an area surrounded by the partitioned areas, at the same image magnification as the camera modules. It is simple that in order to make identical the magnifications of the subject that is shot with the local camera and the area surveillance camera focused for the same shooting distance, the imaging lenses of these cameras are set to have the same optical specifications.

Also, in order to enhance functions of the surveillance camera system, it is effective to use a second area surveillance camera which has a focal length different from that of the area surveillance camera or those of the camera modules, and which is focused for a second shooting distance different from the first shooting distance, a shooting magnification of the second area surveillance camera focused for the second shooting distance being substantially equal to that of the area surveillance camera focused for the first shooting distance.

According to the above configuration, the area surveillance camera and the local camera take a shot individually. Therefore, the exposure control for one of the area surveillance camera and the local camera does not influence on the exposure control for the other at all. If the angle of view of the local camera is narrow sufficiently in view of an image size of the target of surveillance, such a situation can be prevented that even if automatic exposure control is applied based on the screen average metering, the target of surveillance is extremely overexposed or underexposed. Also, when an image captured by the area surveillance camera and an image captured by the local camera are displayed in parallel or both images are combined and displayed on the monitor, the target of surveillance can have the same image size. Therefore, the easy-observe screen display can be obtained. When the area surveillance camera includes the plurality of camera modules, an image size of the subject can be increased while keeping a wide shooting area. When the second area surveillance camera is used together, the image of the subject can be captured clearly with the second shooting distance different from the first shooting distance at another magnification. Also a surveillance effect can be enhanced.

DETAILED DESCRIPTION OF EMBODIMENTS OF THE INVENTION

Figure 1:
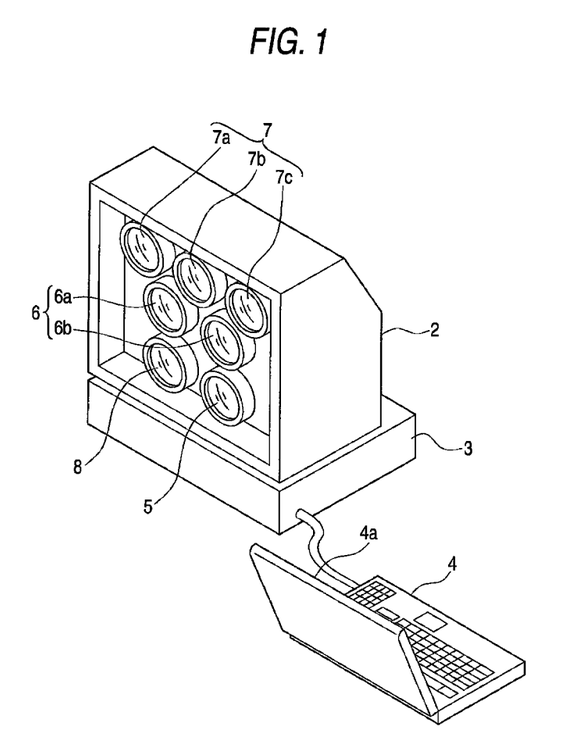
FIG. 1 is an appearance diagram of a surveillance camera system according to an embodiment of the invention.

As an embodiment of the invention, an external appearance of a surveillance camera system used for the purpose of conducting surveillance over a vehicle running on the road is shown in FIG. 1. This camera system includes a shooting unit 2, a control unit and a mobile personal computer 4. The control unit 3 controls driving of plural types of cameras or camera modules incorporated into the shooting unit 2 and has a built-in recording device for recording obtained image data. The mobile personal computer 4 is connected to the control unit 3. An image is displayed on a monitor 4a of the personal computer 4 based on an edited image signal output from the control unit 3. In this case, a dedicated monitor may be connected for image display instead of the personal computer 4.

The shooting unit 2 and the control unit 3 are fitted to an interior of a car via a support device that has a shock absorbing action. Various types of cameras incorporated into the shooting unit 2 take a shot of a car ahead through the windshield of the car. The mobile personal computer 4 is operated by an operator in a passenger seat, for example, to observe an image. Also, an image display mode and an operation of the camera can be switched appropriately by the input operation via a keyboard. In the case where the image observation is made by using the dedicated monitor in place of the personal computer 4, the operation of the camera and the image display mode can be switched via an operation panel provided to the control unit 3.

A first camera 5, a second camera 6 including two camera modules 6a, 6b, a third camera 7 including three camera modules 7a, 7b, 7c, and a local camera 8 are incorporated into the shooting unit 2. The first to third cameras 5 to 7 take a shot at the substantially same angle of view. However, focal lengths of respective imaging lenses are set so as to be longer in this order. Also, focuses of the respective imaging lenses are set so that optimum shooting distances become longer in this order. As a result, these cameras 5 to 7 are used as three types of area surveillance cameras whose proper shooting distances are different.

The structure of the camera modules 6a, 6b including their imaging lenses are totally identical with each other. Respective shooting optical axes thereof are inclined so that the camera modules 6a, 6b can take a shot of a shooting area of the second camera 6 with the shooting area of the second camera 6 divided into two areas. Similarly, the structure of the camera modules 7a, 7b, 7c including their imaging lenses are totally common. Shooting optical axes thereof are inclined so that the camera modules 7a, 7b, 7c can take a shot of an overall shooting area of the third camera 7 with the shooting area of the third camera 7 divided into three areas. Here, the camera modules 6a, 6b and the camera modules 7a, 7b, 7c are aligned horizontally to eliminate a parallax in the vertical direction. However, it is not necessary to insist on the horizontal alignment because a mutual interval is very small in contrast to the shooting distance.

The camera structure of the local camera 8 including its imaging lens is totally identical with those of the camera modules 7a, 7b, 7c constituting the third camera 7. However, only an angle of view of the local camera 8 is narrower than the respective camera modules so that the local camera 8 takes a shot of only a local shooting area in the shooting area of the third camera 7. Depending on the purpose of surveillance, a part of the shooting area of the second camera 6 may be shot with the local camera 8 by omitting the third camera 7. Furthermore, a part of the shooting area of the first camera 5 may be shot with the local camera 8 by omitting the second camera 6.

Then, FIG. 2 schematically shows the configurations of the respective cameras. FIG. 2A shows the first camera 5. Subject light transmitting through an imaging lens 5c is converted by an image sensor 10, and then output as an imaging signal. As the image sensor 10, a solid state imaging device such as CCD type, MOS type, or the like is employed. An angle of view θ1 of the first camera 5 is determined based on a focal length f1 of the imaging lens 5c and an effective screen size of the image sensor 10. The angle of view θ1 of this first camera 5 is set larger than those of the second and third cameras 6, 7.

Figure 2A:
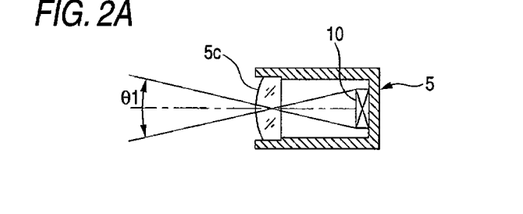
FIG. 2 is schematic section views showing the configurations of an area surveillance camera and a local camera.
Figure 2B:
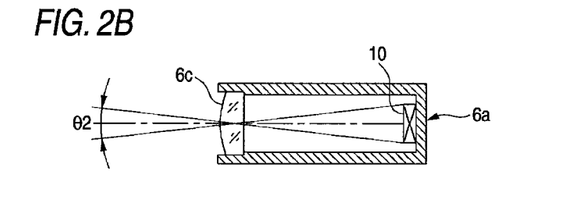

FIG. 2B shows the camera module 6a of the second camera 6. The image sensor 10 in the first camera 5 is also used commonly. A focal length f2 of an imaging lens 6c is set to be twice as long as the focal length f1 of the first camera 5. An angle of view θ2 of the second camera 6 is set to be almost ½ of the angle of view θ1 of the first camera 5 so that the shooting area of the second camera 6 can be shot with being divided into two areas.

Figure 2C:
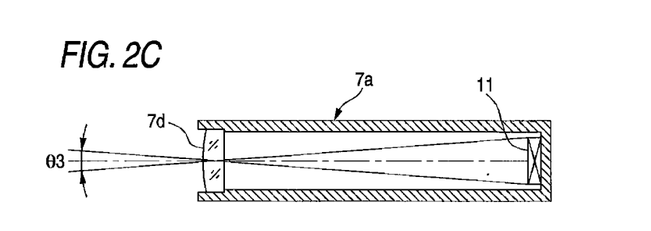

FIG. 2C shows the camera module 7a of the third camera 7. A focal length f3 of an imaging lens 7d is set to twice as large as that of the focal length f2 of the second camera 6. However, an angle of view θ3 of the third camera 7 is set to be almost ½ of the angle of view 91 of the first camera 5 so that the shooting area of the third camera 7 can be shot with being divided into three areas. For this purpose, an image sensor 11 whose effective screen size is larger than the image sensor 10 is employed. Here, when the shooting area of the third camera 7 is divided into four equal areas, four camera modules are required, but the image sensor 10 can be used in common.

Figure 2D:
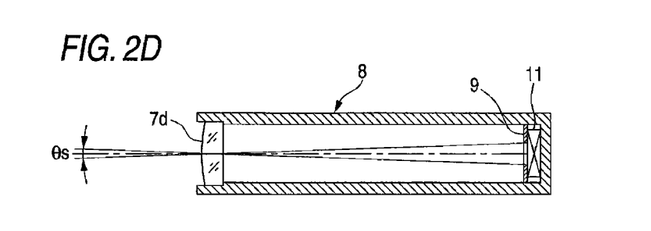

FIG. 2D shows the local camera 8. In the local camera 8, the imaging lens 7d which is the same one as that in the camera module 7a is used and also, the same image sensor 11 is used. In this case, a light shielding mask 9 is provided in the front surface of the image sensor 11. Thereby, an effective screen size of the image sensor 11 is adjusted to be narrower than that of the camera module 7a. Therefore, an angle of view θs is further narrowed rather than the angle of view θ3. However, in this local camera 8, the imaging signals from the pixels being covered with the light shielding mask 9 are electrically invalidated by an image signal processing circuit 18, and are never reflected in processes of an AE control circuit 21. Also, pixel-position information of the invalidated imaging signal is written in advance into an EEPROM 24.

Figure 3:
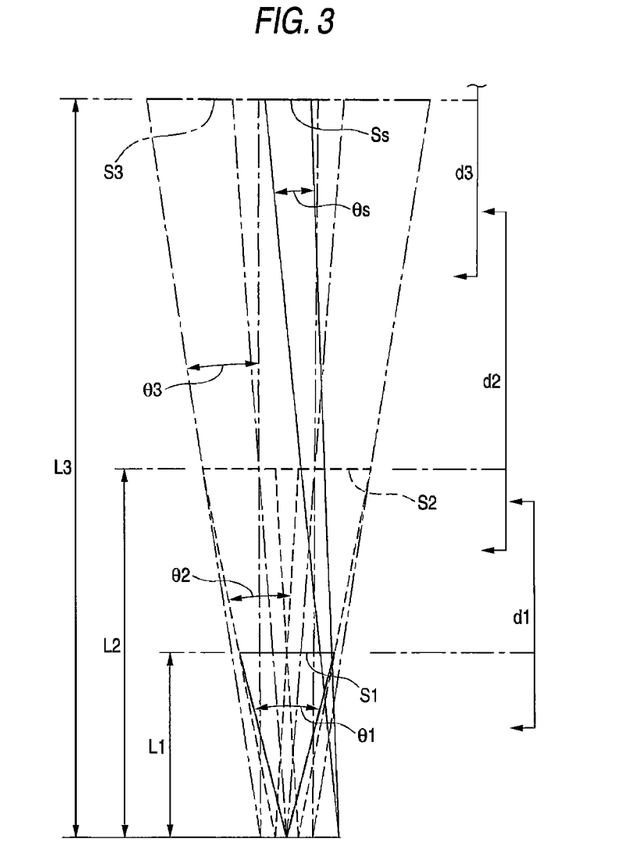
FIG. 3 is an explanatory view showing an angle of view of each camera and a shooting area.

The shooting areas of the respective cameras are schematically shown in FIG. 3. The focus of the first camera 5 having the angle of view θ1 is set so that the shooting distance becomes L1. A shooting area S1 at the shooting distance L1 gives a shooting range, and the first camera 5 has a depth of field d1 across front and rear of the shooting distance L1. The camera modules 6a, 6b having the angle of view θ2 are focused so that the optimum shooting distance becomes L2. The shooting optical axes thereof are inclined respectively as indicated by broken lines so that the shooting area S1 of the first camera 5 can be shot with being divided into two areas. Also, a shooting area S2 gives a shooting range of the second camera 6 as a whole at the shooting distance L2. The second camera 6 has a depth of field d2 across front and rear of a shooting distance L2.

The focuses of the camera modules 7a, 7b, 7c having the angle of view θ3 are set so that the optimum shooting distance becomes L3. The shooting optical axes thereof are inclined as indicated by dot-dash lines so that the shooting area S2 of the second camera 6 can be shot with being divided into three areas. Also, a shooting area S3 gives a shooting range of the third camera 7 as a whole at the shooting distance L3. The third camera 7 has a depth of field d3 across front and rear of the shooting distance L3. Like the camera module 7a, the local camera 8 having the angle of view θs is focused to the shooting distance L3. A shooting area Ss contained in the shooting area S3 of the third camera 7 gives a shooting range at the shooting distance L3. The local camera 8 has almost the same depth of field as d3. Here, all the angles of view θ1 to θ3 and θs represent the angles of view in the horizontal direction. Angles of view in the vertical direction may be set appropriately in accordance with what size an image of the subject which is a target of surveillance is, while taking account of the case where the subject is shot at the optimum shooting distances L1 to L3, respectively.

The shooting distances L1 to L3 of the first to third cameras 5 to 7 correspond to the focal lengths f1 to f3 of the imaging lenses of the respective cameras, and are set to satisfy f1/L1=f2/L2=f3/L3. For example, when the focal lengths f1, f2, f3 of the respective imaging lenses are set to 50 mm, 100 mm, 200 mm, respectively, the respective shooting distances L1, L2, L3 are set to 50 mm, 100 mm, 200 mm. As a result, a magnification ratio obtained when the subject located at the shooting distance L1 is shot with the first camera 5, a magnification ratio obtained when the subject located at the shooting distance L2 is shot with the second camera 6, and image magnification ratio obtained when the subject located at the shooting distance L3 is shot with the third camera 7 are set equal to each other.

Widths of the depths of field d1 to d3 of the respective cameras change according to the focal lengths of the respective imaging lenses and the optimum shooting distances being set, and also change depending upon a diameter of the aperture provided in the imaging lens systems. As well known, when an aperture diameter of the diaphragm is made small, the depth of field can be largely improved. Thus, a range over which the image is considered to be in focus can be extended. For example, the first camera 5 having the imaging lens whose focal length is 50 mm or the second camera 6 having the imaging lens whose focal length is 100 mm can get the depth of field in a wide range by throttling the diaphragm to about F4 or F5.6, and can cover a range up to infinity in the back focal length. Also, since the depths of field of the first camera 5 and the second camera 6 overlap partially with each other and the depth of field of the second camera 6 and the third camera 7 overlap partially with each other, the subject as the target of surveillance located within the shooting distance contained in the depths of field d1 to d3 can be shot with at least any one of the cameras in a focused state.

Figure 4:
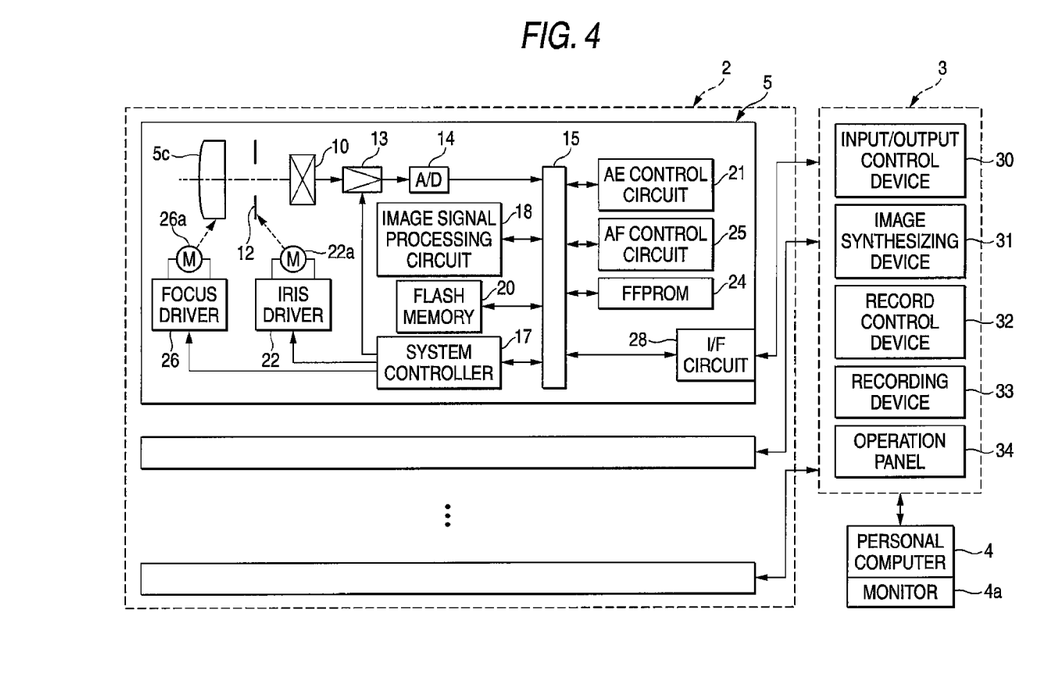
FIG. 4 is a block diagram showing an outline of the electrical configuration of the surveillance camera system.

An outline of the electrical configuration of the first camera 5 is shown in FIG. 4. Since the electrical configurations of the camera modules 6a, 6b constituting the second camera 6 and those of the camera modules 7a, 7b, 7c constituting the third camera 7 are basically similar to that of the first camera 5, their illustration and explanation will be omitted herein. As described above, the first camera 5 has the imaging lens 5c whose focal length is 50 mm, and forms the subject image on the image sensor 10 through the diaphragm 12. The imaging signal from the image sensor 10 is amplified up to an adequate level by an AGC amplifier 13, is converted into a digital imaging signal by an A/D converter 14 and then input into a system bus 15.

The imaging signal thus input is subjected to the well-known image processing by the image signal processing circuit 18 under control of a system controller 17, and then is written into a flash memory 20 as an imaging signal in units of frame in a predetermined format. The AE control circuit 21 executes the average metering in units of frame and determines as to whether or not a mean brightness of the image signal is in an appropriate range. Then, the AE control circuit 21 drives an iris motor 22a via an iris driver 22 based on the determination result to control an aperture diameter of the diaphragm 12. At this time, the maximum aperture diameter is restricted based on diaphragm value data written in the EEPROM 24 to prevent such a situation that the diaphragm 12 is excessively opened. Also, when an exposure value is insufficient in that state, a gain of the AGC amplifier 13 is adjusted via the system controller 17.

An AF control circuit 25 evaluates a focusing level based on a contrast component of the image signal as well known, and inputs an evaluation signal into the system controller 17. The system controller 17 drives a focus motor 26a via a focus driver 26 so that the evaluation signal becomes the highest level. Therefore, the imaging lens 5c is feedback-controlled to the position at which a contrast component of the image signal has the maximal value, and the imaging lens 5c is moved to a focus position based on the automatic following system.

In this case, normally the focusing operation performed by AF control circuit 25 is omitted from the camera system according to the embodiments of the invention. Also, the system controller 17 causes the focus driver 26 and the focus motor 26a to move the imaging lens 5c to the focus setting position so that this camera system is focused for the shooting distance L1, which is written in the EEPROM 24. Thereafter, the imaging lens 5c is held in this position as it is and a fixed-focus shooting is performed as it is. In this event, the electrical configurations of the camera modules 6a, 6b constituting the second camera 6, the camera modules 7a, 7b, 7c constituting the third camera 7, and the local camera 8 are basically similar to that of the first camera 5 except that the focal lengths of the imaging lenses 6c, 7d are different from that of the imaging lens 5c of the first camera 5 and that the optimum shooting distances L2, L3 and diaphragm value data are different.

The image signals captured by the respective cameras in this manner are input into the control unit 3 via an interface circuit 28. An input/output control device 30, an image synthesizing device 31, a record control device 32, a recording device 33, and an operation panel 34 are provided in the control unit 3. Also, the personal computer 4 having the monitor 4a is connected to the control unit 3. The input/output control device 30 controls input/output of the image signal and control data into/from the interface circuit 28 provided in each camera. The image synthesizing device 31 individually processes the respective image signals from the first camera 5, the second camera 6, the third camera 7, and the local camera 8. Also, the image synthesizing device 31 combines two images of the second camera 6 or three mages of the third camera 7 into a single image.

The record control device 32 controls an operation of the recording device 33 such as a DVD recorder in response to an operation input from the operation panel 34 and the personal computer 4. The recording device 33 records the image signals, which are acquired from the respective cameras and combined into data corresponding to one screen if necessary, as a moving picture. Also, the recording device 33 can record a still picture in parallel in response to a release operation signal input from the operation panel 34 or the personal computer 4 or a release signal output at every predetermined time period set by a timer.

Then, an operation of the camera system will be explained hereunder. Prior to shooting, initialization is made based on the operation input from the operation panel 34 of the control unit 3 or the personal computer 4. Items to be initialized include the shooting distances L1, L2, L3 of the first camera 5, the second camera 6, and the third camera 7. These data is written into the EEPROMs 24 of the respective cameras. Also, setting of the optimum shooting distance of the local camera 8 is executed simultaneously with setting of the shooting distance of the third camera 7. The system controller 17 reads the setting data, and causes the focus driver 26 and the focus motor 26a to position the respective imaging lenses in such a way that these lenses are focused for the optimum shooting distances L1, L2, L3, respectively.

After the shooting distances of the respective cameras are set, inclinations of the shooting optical axes of the respective cameras with respect to the horizontal direction are adjusted. An adjusting mechanism for tilting the shooting optical axes of the respective cameras with respect to the horizontal direction is provided in a base of the shooting unit 2 that holds the respective cameras. In a simple case, this adjusting mechanism is manually operated while an image displayed on the monitor 4a is checked. Of course, if the electrically operated adjusting mechanism is provided, the direction of the shooting optical axes can be automatically adjusted at a point of time when the initialization of the optimum shooting distance is executed. In this case, the inclination of the shooting optical axes in the vertical direction may be basically set horizontally in the respective cameras. Preferably, the shooting optical axes should also be inclined even in the vertical direction to absorb an error caused in assembling the respective cameras.

After focus settings of the respective cameras are initialized, the diaphragm value data used to restrict the maximum aperture diameters of the diaphragms 12 of the respective cameras are written into the EEPROM 24. While considering the focal lengths of the imaging lenses and the depths of field determined based on the optimum shooting distances, the maximum aperture diameters of the diaphragms 12 are determined so that the depths of field d1, d2, d3 shown in FIG. 3 overlap partially with each other. A value of the depth of field can be calculated based on the focal length of the imaging lens, the shooting distance, and the diaphragm value. Therefore, if a calculation algorithm prepared under the condition that the depths of field are overlapped with each other is employed, the diaphragm value data can be set automatically without depending on the manual input.

In the case where about F4 is set in the first camera 5 and about F5.6 is set in the second camera 6, the third camera 7 and the local camera 8 as a diaphragm value used to determine the maximum aperture diameter of the diaphragm 12, the shooting can be performed at the almost proper exposure while ensuring the depths of field d1, d2, d3 that overlap with each other as shown in FIG. 3, except a situation such as a nighttime where the brightness is extremely insufficient. Also, since the diaphragm 12 is throttled by the iris motor 22a at a time of shooting in the bright daytime, the depths of field of the first camera 5 and the second camera 6 can cover infinity. Even though brightness is insufficient in a situation that the maximum aperture diameter of the diaphragm 12 is restricted based on the diaphragm value data written in the EEPROM 24, the AGC amplifier 13 operates effectively to prevent underexposure.

It is possible to align and display images from the first camera 5, the camera modules 6a, 6b, the camera modules 7a, 7b, 7c, and the local camera 8 on the monitor 4a as they are. As shown on a monitor screen 4b in FIG. 5, preferably an image 45 from the first camera 5, a standard combined image 46 in which images 46a, 46b from the camera modules 6a, 6b are combined in a single image, a combined image 47 in which images 47a, 47b, 47c from the camera modules 7a, 7b, 7c are combined in a single image, and a local image 48 from the local camera 8 are aligned and displayed on the monitor screen 4b. Also, date information 49 representing the shooting date and time, and position information 50 representing the latitude and the longitude obtained from the GPS system, which is incorporated into the control unit 3, are displayed moment by moment on the monitor screen 4b. Also, these information as well as moving picture data is recorded on the recording medium by the recording device 33.

The image combining process is executed by recognizing a boundary between the respective images which is a combining target by means of the pattern recognition, trimming the images along appropriate boundary lines, and then coupling the respective images together. Although density difference easily occurs in the boundary areas because the respective images to be combined are exposure-controlled individually by the separate cameras, the respective images may be simply coupled together as they are. Also, the overall density of the coupled images may be adjusted by adjusting gradation so that the density difference in the boundary portion is made inconspicuous by the smoothing process, or equalizing the densities of individual images.

Figure 5:
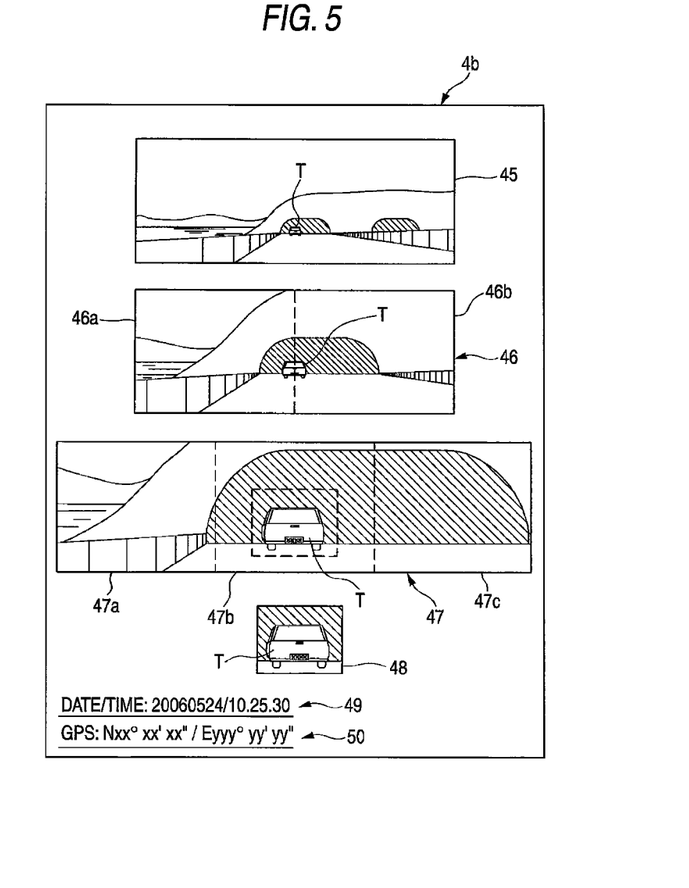
FIG. 5 is an explanatory view showing an example of a captured image when a vehicle is selected as a target of surveillance.

FIG. 5 shows an example of the monitor screen 4b during a period in which the surveillance camera system is continuously shooting a particular vehicle T running on the road as a target of surveillance. FIG. 5 shows the situation that a license plate of the vehicle is checked while shooting the vehicle T from a distance. Under such situation, the shooting is done while keeping the distance between cars close to the shooting distance L3 of the third camera 7 that has the longest focal length. Since this shooting distance L3 is a considerably longer distance than the shooting distances L1, L2, image sizes of the vehicle T captured by the first camera 5 of the second camera 6 becomes small as shown in FIG. 5. Even though the vehicle T has already entered into the depths of field of the first camera 5 or the second camera 6, it is difficult to check the license plate of the vehicle.

In the image 47 of the third camera 7, the image size enough to check the license plate of the vehicle can be provided. This image of the vehicle T is shot with the camera module 7b. However, the AE control circuit 21 of the camera module 7b executes the exposure control by the so-called average metering system so that mean brightness of the overall single screen captured individually is kept at a proper level, irrespective of other cameras or camera modules. For this reason, when the dark area in the tunnel widens in the image 47b, an aperture diameter of the diaphragm 12 is increased to increase the exposure value of the overall image 47b. After the aperture diameter of the diaphragm 12 is excessively increased and then exposure is restricted based on the diaphragm value data in the EEPROM 24, the imaging signal is amplified by the AGC amplifier 13 to control the exposure so as to render the image 47b brighter as a whole.

However, since the vehicle T itself is still in front of the tunnel and is located in a sufficiently bright state, a considerable overexposure state is brought about when the exposure control is applied so as to render the image 47b brighter as a whole as described above. In the extreme case, the so-called "whiteout" is caused and such image cannot be captured as an image with which the license plate of the vehicle is checked. Unlike a general digital camera that can select framing freely, it is difficult for a onboard or stationarily fixed surveillance camera, which is used in a situation that a position of the vehicle T as a target of surveillance in a predetermined shooting area is not fixed, to avoid such problem. In addition, it is highly probable that such situation is caused not only in the exposure control using the full screen average metering but also in the center spot metering and the multi-pattern type center priority metering. The center spot metering measures a light amount only in the center area of the screen. The multi-pattern type center priority metering measures a light amount by giving a weight that is increased gradually from the peripheral portion of the screen to the center portion.

In such case, it is effective to shoot a local area contained in the shooting area S3 of the third camera 7 with the dedicated local camera 8. As illustrated, since the shooting area Ss of the local camera 8 is set to have a size that is sufficiently narrower than the shooting range of the camera module 7b but not excessively narrow, the local camera 8 can capture the vehicle T within its shooting range without fail and the dark area of the tunnel is eliminated considerably from the shooting screen. Therefore, even if the vehicle T is shot with the local camera 8 under similar automatic exposure control, the vehicle T is not shot in an extremely overexposure condition and it is easy to check the license plate of the vehicle T. Also, since this image is one obtained by cutting out a part of the image 47b while maintaining the image size, a user doesn't get confused in observation even though the images are displayed with being simply aligned.

Here, since a size and a position of the shooting area Ss of the local camera 8 is determined in advance, the image synthesizing device 31 may put the local image 48 captured by the local camera 8 may into the image 47b captured by the camera module 7b to obtain a combined image. In this case, it is feared that the brightness of the local image 48 is different unnaturally from the surrounding image 47b. However, since the vehicle T as the target of surveillance is captured as an image having almost proper brightness, there is no problem in practical use. Then, when the vehicle T goes through the tunnel and comes near to an exit, the shooting is done so that the vehicle T is underexposed under the opposite automatic exposure control. In this case, it is of course that this camera system can operate effectively.

As described above, when this camera system is used as an onboard camera system for the surveillance over a car being running on the road, such a situation is predicted that an extreme change in brightness is caused in the shooting area of the telescopic camera because of the presence of the tunnel. At that time, how large an image size of the car in the shooting area S3 to be captured with the whole third camera 7 is can be calculated based on the focal length and the optimum shooting distance of the camera module 7b. Also, in order to prevent the situation that the car is extremely overexposed or underexposed, how large a size of the shooting area Ss of the local camera 8 should be set and what position in the screen the camera module 7b should be set can be checked in a simulation manner in advance.

For example, as in the above embodiment, if a size of the shooting area Ss of the local camera 8 is set to 30% to 60% of the screen size of the camera module 7h, the horizontal position of the local camera 8 is set to coincide with the center of the image 47b and the vertical position is set to shift downward by 20% to 30%, such a problem can be avoided that even though the ordinary camera having the usual AE control circuit 21 is employed as the respective cameras, detail information of a subject as a surveillance target is missing due to overexposure or underexposure during shooting.

Further, it is feared that the headlight of an oncoming vehicle, the illumination of a streetlight or a shopping street would cause the surrounding brightness of the car as the target of surveillance to change largely during the shooting in an evening or a nighttime. In this case, according to the above configuration, such influence can be reduced drastically. Also, in the case of the onboard road surveillance system explained in this embodiment, for example, three local cameras 8 may be prepared and the shooting areas Ss of the local cameras 8 may be set to the camera modules 7a, 7b, 7c, respectively. Also, the surveillance camera system of the invention is not limited to the onboard surveillance camera and can be applied similarly to the stationarily fixed surveillance camera. In the stationarily fixed surveillance camera, three types of the first to third area surveillance cameras are not needed in many cases unlike the above embodiment. In this case, the system of the invention may be constructed by using a combination of one area surveillance camera and one local camera.

Figure 6:
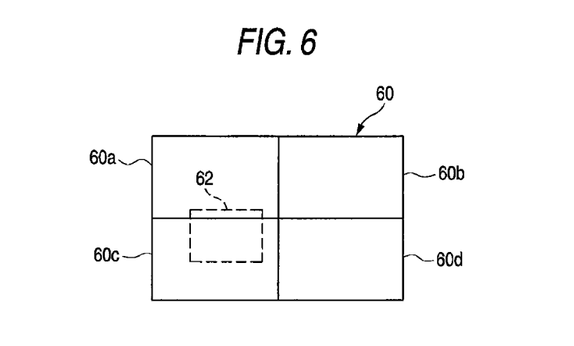
FIG. 6 is an explanatory view showing another example of the shooting area.
Figure 7:
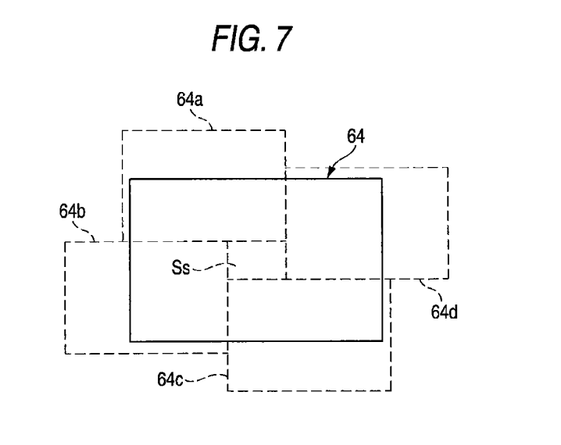
FIG. 7 is an explanatory view showing further another example of the shooting area.

In the above embodiment, a part of the shooting range of the camera module 7b is set as the shooting area Ss of the local camera 8. In this case, for example, the shooting area Ss of the local camera 8 may be set to cover the respective shooting ranges of the camera module 7a and the camera module 7c. Also, as shown in FIG. 6, when a shooting area 60 of the area surveillance camera is shot with four camera modules and then an image of the area surveillance camera is obtained by combining respective shooting screens 60a, 60b, 60c, 60d, a shooting area 62 of the local camera may be set as shown in FIG. 6. Also, as shown in FIG. 7, a shooting area 64 of the area surveillance camera is constructed by combining images 64a, 64b, 64c, 64d obtained from four camera modules and then applying the image combining and trimming process to a resultant area. Also, the area surrounded by the shooting ranges of the respective camera modules is shot as the shooting area Ss of the local camera. Thereby, one screen can be constructed as a whole as the image.

With the above, the invention is explained based on the illustrated embodiment. In this case, concrete values such as the focal length and the angle of view of the imaging lens, the optimum shooting distance, the diaphragm stop, etc. used in the area surveillance camera are listed for illustrative purposes. These values may be changed appropriately according to the use of the surveillance camera system and using modes. Also, the size and the position of the shooting area of the local camera can be changed appropriately by taking account of previously supposed brightness changing modes. It is effective that the shooting optical axis of the local camera should be changed manually or by an electric power.

What is claimed is:

1. A surveillance camera system comprising:
    an area surveillance camera focused for a first shooting distance, the area surveillance camera configured to shoot a predetermined shooting area that is determined based on an angle of view; and a local camera focused for the first shooting distance, the local camera configured to shoot a local area, which is a part of the predetermined shooting area, at an angle of view narrower than that of the area surveillance camera and at a magnification ratio substantially equal to that of the area surveillance camera, wherein:

the area surveillance camera and the local camera take a shot under individual automatic exposure control, respectively, and the area surveillance camera comprises a plurality of camera modules that individually shoot partitioned areas obtained by partitioning the predetermined shooting area into substantially identical areas, and the local camera has the angle of view narrower than those of the camera modules, and the local camera shoots the local area which comprises a target of surveillance, the local area being a part of any one of the partitioned areas being shot with any one of the camera modules, at a magnification ratio substantially equal to those of the camera modules, and wherein the area surveillance camera and the local camera execute the automatic exposure control so that the target of surveillance is not extremely overexposed or extremely underexposed.

2. The surveillance camera system according to claim 1, wherein said automatic exposure control performed by the area surveillance camera and the local camera so that the target of surveillance is not extremely overexposed or extremely underexposed, is based on an average metering, respectively.

3. The surveillance camera system according to claim 1, wherein:

the local camera shoots only an area, which is contained in the predetermined shooting area and which is surrounded by the partitioned areas shot with the plurality of camera modules, at a magnification ratio substantially equal to those of the camera modules.

4. The surveillance camera system according to claim 2, wherein:

the local camera shoots only an area, which is contained in the predetermined shooting area and which is surrounded by the partitioned areas shot with the plurality of camera modules, at a magnification ratio substantially equal to those of the camera modules.

5. The surveillance camera system according to claim 1, wherein an imaging lens of the local camera has same optical specifications as imaging lenses of the camera modules.

6. The surveillance camera system according to claim 2, wherein an imaging lens of the local camera has same optical specifications as imaging lenses of the camera modules.

7. The surveillance camera system according to claim 3, wherein an imaging lens of the local camera has same optical specifications as imaging lenses of the camera modules.

8. The surveillance camera system according to claim 4, wherein an imaging lens of the local camera has same optical specifications as imaging lenses of the camera modules.

9. The surveillance camera system according to claim 1, further comprising:

a second area surveillance camera having a focal length different from that of the area surveillance camera, the second area surveillance camera focused for a second shooting distance different from the first shooting distance, a magnification ratio of the second surveillance camera focused for the second shooting distance being substantially equal to that of the area surveillance camera focused for the first shooting distance.

10. The surveillance camera system according to claim 2, further comprising:

a second area surveillance camera having a focal length different from that of the area surveillance camera, the second area surveillance camera focused for a second shooting distance different from the first shooting distance, a magnification ratio of the second surveillance camera focused for the second shooting distance being substantially equal to that of the area surveillance camera focused for the first shooting distance.

11. The surveillance camera system according to claim 3, further comprising:

a second area surveillance camera having a focal length different from that of the area surveillance camera, the second area surveillance camera focused for a second shooting distance different from the first shooting distance, a magnification ratio of the second surveillance camera focused for the second shooting distance being substantially equal to that of the area surveillance camera focused for the first shooting distance.

12. The surveillance camera system according to claim 4, further comprising:

a second area surveillance camera having a focal length different from that of the area surveillance camera, the second area surveillance camera focused for a second shooting distance different from the first shooting distance, a magnification ratio of the second surveillance camera focused for the second shooting distance being substantially equal to that of the area surveillance camera focused for the first shooting distance.

13. A surveillance camera system comprising:

a first area surveillance camera focused for a first shooting distance, the first area surveillance camera configured to shoot a predetermined shooting area that is determined based on an angle of view;

a second area surveillance camera having a focal length different from that of the first area surveillance camera, the second area surveillance camera focused for a second shooting distance different from the first shooting distance, a magnification ratio of the second surveillance camera focused for the second shooting distance being substantially equal to that of the first area surveillance camera focused for the first shooting distance; and a local camera focused for the first shooting distance, the local camera configured to shoot a local area, which is a part of the predetermined shooting area, at an angle of view narrower than that of the first area surveillance camera and at a magnification ratio substantially equal to that of the area surveillance camera, wherein:

the first area surveillance camera and the local camera take a shot under individual automatic exposure control, respectively, the first area surveillance camera comprises a plurality of camera modules that individually shoot partitioned areas obtained by partitioning the predetermined shooting area into substantially identical areas, the first area surveillance camera and the local camera execute the automatic exposure control based on an average metering, respectively, and the local camera has the angle of view narrower than those of the camera modules, and the local camera shoots the local area, which is a part of any one of the partitioned areas being shot with any one of the camera modules, at a magnification ratio substantially equal to those of the camera modules.

* * * * *